(12) United States Patent
Wohlford (10) Patent No.: US 10,184,953 B2
(45) Date of Patent: Jan. 22, 2019

(54) PITOT-STATIC ANEMOMETRIC TEST ADAPTER

(71) Applicant: Cobra Systems, Inc., Arlington Heights, IL (US)

(72) Inventor: Mark Wohlford, Arlington Heights, IL (US)

(73) Assignee: Cobra Systems, Inc., Arlington Heights, IL (US)

( * ) Notice: Subject to any disclaimer, the term of this patent is extended or adjusted under 35 U.S.C. 154(b) by 148 days.

(21) Appl. No.: 15/231,020

(22) Filed: Aug. 8, 2016

(65) Prior Publication Data

US 2018/0038720 A1    Feb. 8, 2018

(51) Int. Cl.
*G01F 1/46*    (2006.01)
*G01P 21/02*    (2006.01)
*G01P 5/16*    (2006.01)

(52) U.S. Cl.
CPC .............. *G01P 21/02* (2013.01); *G01F 1/46* (2013.01); *G01P 5/16* (2013.01)

(58) Field of Classification Search
CPC ........................................................ G01F 1/46
USPC ........................................................ 73/1.29
See application file for complete search history.

(56) References Cited

U.S. PATENT DOCUMENTS

| | | | |
|---|---|---|---|
| 3,518,870 A | 7/1970 | Shubert et al. | |
| 4,384,469 A * | 5/1983 | Murphy | G01F 25/0007 73/1.29 |
| 4,617,826 A * | 10/1986 | Hagen | G01L 27/007 73/1.29 |
| 7,581,426 B2 | 9/2009 | Gilday | |

OTHER PUBLICATIONS

AvionTEq-Nav-Aids Pitot Static Test Adapter for Piper—Part No. PS56620M2-4-4, Aug. 3, 2014, one page.*
DMA; Pitot-static Testing and the Role of the Probe Adaptors; 2014, pp. 1-2.
DMA; Pitot-static Adapters; 2014, pp. 1-4.
Nav-Aids Ltd.; Barfield Inc.; Aircraft Maintenance Repair Overhaul & Support; Miami Florida, pp. 1-19.
AvionTeq; Nav-Aids Pitot Static Test Adapter for Piper-Part Number: P556620M2-4-4; 2016; Van Nuys, CA, one page.

* cited by examiner

*Primary Examiner* — Daniel S Larkin
(74) *Attorney, Agent, or Firm* — Young Basile Hanlon & MacFarlane, P.C.

(57) ABSTRACT

An adapter for isolating the at least one pressure port of a pitot-static tube from ambient conditions. The adapter can be used to perform aircraft anemometric testing and provides a replaceable, leak-proof seal for communicating pressures from the aircraft pitot-static system to testing equipment.

20 Claims, 9 Drawing Sheets

PITOT-STATIC ANEMOMETRIC TEST ADAPTER

TECHNICAL FIELD

Embodiments of the present disclosure relate generally to devices for anemometric testing aircraft pitot-static tubes and associated components. More particularly, certain embodiments of the present disclosure relate to a testing adapter for isolating the dynamic and static ports of an aircraft pitot-static tube from ambient conditions as well as from one another.

BACKGROUND

Pitot-static tubes, which are also called Prandtl tubes, are used on aircraft as speedometers. The actual tube on the aircraft can be around ten inches long with a half inch diameter. Several small holes are drilled around the outside of the tube and a center hole is drilled down the axis of the tube. The outside holes are connected to one side of a pressure transducer. The center hole in the tube is kept separate from the outside holes and is connected to the other side of the transducer. The transducer measures the difference in pressure in the two groups of tubes by measuring the strain in a thin element using an electronic strain gauge. The pitot-static tube is mounted on the aircraft, or in a wind tunnel, so that the center tube is always pointed in the direction of the flow and the outside holes are perpendicular to the center tube. On some airplanes the pitot-static tube is put on a longer boom sticking out of the nose of the plane or the wing.

Since the outside holes are perpendicular to the direction of flow, these tubes are pressurized by the local random component of the air velocity, or static pressure. The center tube, however, is pointed in the direction of travel and is pressurized by both the static pressure and the ordered air velocity (dynamic pressure). The pressure in the pitot-static tube is the total pressure and, by measuring the difference in total and static pressure, the pressure transducer calculates the dynamic pressure. Bernoulli's equation states that the static pressure plus one half the density times the velocity squared is equal to the total pressure. Therefore it follows that velocity squared equals the product of two times the dynamic pressure (difference in total pressure and static pressure) divided by density. Bernoulli's equation can then be used to calculate velocity by utilizing the dynamic pressure and the local value of air density from pressure and temperature measurements.

Besides aircraft speedometers, pitot-static tubes are coupled with additional aircraft instruments which are responsive to the impact pressures at the dynamic port of the tube and the static pressures at the static ports. For example, the altimeter and vertical velocity indicator are responsive to static pressure conditions, while the air speed and Mach number indicator are responsive to both dynamic and static pressures. Other instruments that might be connected are air data computers, flight data recorders, altitude encoders, cabin pressurization controllers, and various airspeed switches. Occasionally these instruments, various associated components, or the lines interconnecting the pitot-static system and the ports of the pitot-static tube develop leaks, causing the instruments to give erroneous readings. Errors in pitot-static system readings can be extremely dangerous as the information obtained from the pitot-static system, such as altitude, is potentially safety-critical. Thus the entire system associated with the pitot-static tube must be tested frequently to insure that no leaks are present which would cause erroneous readings.

Pitot-static tube testing adapters are used to perform anemometric tests by inducing known pressures in the dynamic and static lines leading from the pitot-static tube of an aircraft. Such adapters utilize seals to facilitate leak-free connections to the dynamic port and static ports. The testing adapters must be simple and reliable in design to ensure easy and repeatable installation. Also, in order to maintain the integrity of the pitot-static tube, testing adapters must not damage the tube or ports.

Various types of pitot-static tube testing adapters are commercially available, dependent upon the pitot-static tube design of the aircraft. Some pitot-static tube testing adapters are retained on the aircraft skin, while others are attached only to the pitot-static tube. Ultimately, the pitot-static tube tester must fit the design of the aircraft in such a way that a leak-free seal is made with both the center hole and outside static holes of the pitot-static tube without damaging the aircraft or the pitot-static tube probe, including the addition of any undue stress loading or probe misalignment.

One particular commercially available pitot-static tube testing adapter is made to be compatible with the downward-extending blade-type pitot probes found on the Piper Aircraft line, including Archer, Arrow, Warrior, Seminole, and Seneca models. This adapter mounts directly to the pitot-static tube, utilizing a clamp to attach the tester to the pitot-static tube. A rubber seal is glued in place on both sides of the clamp, the bottom rubber seal to prevent damage to the body of the tube and the top rubber seal to promote a leak-proof connection to the pitot or dynamic ports. However, the top dynamic seal often leaks and removal of a worn or leaking seal requires cutting the seal out and then scraping the adhered remnants off with a blade, the difficulty of which is exacerbated by awkward access and space constraints.

Given that the foregoing pitot-static tube testing adapter suffers from one or more limitations relating to the pitot port connection between the testing adapter and pitot-static tube, there is a need to develop a new, economical, better-performing, and replaceable sealing solution for such a testing adapter.

SUMMARY

Embodiments of the present disclosure may comprise one or more of the features recited in the attached claims, and/or one or more of the following features and combinations thereof.

An illustrative embodiment includes an adapter for isolating the forwardly presented horizontally opening pitot ports of a pitot-static tube from ambient conditions, the adapter comprising at least one clamping member for attaching the adapter to the pitot-static tube and an improved pitot seal for isolating the forwardly presented horizontally opening pitot ports of a pitot-static tube from ambient conditions. The seal may have an elongated body having a plurality of protrusions for engaging a plurality of seal grooves defined by a mating body of the pitot-static test adapter.

The body of the pitot-static test adapter may further include a second clamping member for embracing the seal within the mating body of the test adapter. More specifically, the seal may include one protrusion extending along a bottom right edge from a front side to a back side and one protrusion extending along a bottom left edge from the front side to the back side.

Additionally, the bottom side of the seal may define a hemispherical groove to accommodate the pitot-static tube. The hemispherical groove may be further tapered, i.e. wider at one end than the opposite end, to better accommodate the pitot-static tube. In order to communicate pressure conditions from the pitot-static system to the pitot-static test adapter, the seal must further define a communicating hole between the seal top and bottom sides.

To aid in seal alignment during seal installation, the seal may also include a circumferential protrusion extending from the bottom side of the seal and surrounding the communication hole for engaging the mating body of the pitot-static test adapter.

One exemplary object of at least one embodiment disclosed herein is to provide a new, economical, better-performing, and replaceable sealing solution for engagement of a pitot-static testing tube and pitot-static testing adapter.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Additional features of the disclosure will become apparent to those skilled in the art upon consideration of the following detailed description of the illustrative embodiments. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting. The detailed description particularly refers to the accompanying figures in which.

DESCRIPTION OF THE ILLUSTRATIVE EMBODIMENTS

For the purposes of promoting and understanding the principles of the one or more inventions disclosed herein, reference will now be made to one or more illustrative embodiments illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

At least one embodiment of the present disclosure finds industrial applicability to the testing and calibration of aircraft pitot-static instruments by providing an aircraft pitot-static tube adapter that can be installed easily and provide leak-proof communication with the aircraft's pitot-static system. To promote longevity of the testing adapters, it is advantageous for pitot-static adapter seals to be serviceable and replaceable. It is also advantageous for the installation of replacement seals to be simple and repeatable so that seals are installed correctly, avoiding leaks or damage during installation. It is further advantageous for pitot-static tube testers to use a sealing medium that will not contaminate the pitot-static system by breaking apart, becoming lodged in the pitot-static tube or pitot-static system lines, or causing blockages.

Embodiments of the pitot-static testing adapter disclosed herein can be manufactured from standard materials used in the art that possess suitable strength, rigidity and other characteristics appropriate for anemometric testing. Illustrative materials are various metallic materials such as steel, iron, and aluminum, which can optionally be coated, galvanized or electro-plated with other metals; as well as suitable non-metallic materials, e.g., various composites of appropriate strength. The seals disclosed herein may be manufactured of materials that possess sufficient pneumatic sealing properties, such as plastic, neoprene, rubber or any other suitable material, and are ideally formed from halo-butyl rubber, silicone rubber, chloro-butyl rubber, butyl silicone, EPDM, or bromo-butyl rubber.

Referring to FIG. 1A, FIG. 1B, FIG. 1C and FIG. 1D, an illustrative embodiment of a pitot-static anemometric test adapter according to one embodiment of the present disclosure is adapter 110, which includes an improved pitot seal 610 with mating protrusions 620 (shown in detail in FIGS. 6A-6F) that respectively engage a corresponding seal groove 460 defined by a second clamping member 410 (shown in detail in FIGS. 4A-4G) and seal groove 250 defined by clamping member body 210 of the pitot-static test adapter 110. The illustrative embodiment further includes first clamping members 310 and second clamping member 410 that are fastened together, locking the pitot seal 610 into place. Thus, an illustrative pitot seal 610 of at least one embodiment is clamped into place, eliminating the need to use adhesive, permitting the material choice for seal construction based on maximization of sealing properties, and allowing for simple installation and replacement of the pitot seal 610. Further enhancing leak-proof communication with the pitot-static system, an illustrative pitot seal 610 of at least one embodiment also includes a circumferential protrusion 640 extending from a bottom side 614 of the pitot seal and surrounding the communication hole 650 for engaging the second clamping member 410 of the pitot-static test adapter. In comparison to the adapter of the current state of art, at least one embodiment provides better engagement between the aircraft's pitot-static tube 115 and the pitot-static testing adapter 110 while also better facilitating service and repair of the pitot seal 610.

An illustrative embodiment of the present disclosure includes a warning, or "REMOVE BEFORE FLIGHT" streamer assembly 120, to serve as a reminder to users not to fly with the pitot-static testing adapter 110 installed. The conspicuously-colored streamer assembly 120 consists of a warning streamer, sewn-in hook and loop for storing the streamer, and a grommet for securing the streamer. The streamer assembly 120 is attached to the pitot-static adapter 110 via a through-hole 550 of sliding member 510 by a streamer wire tie 122.

Pitot-static testing adapter 110 further includes a clamping member body 210, shown in FIG. 1A, FIG. 1B, FIG. 2A, FIG. 2B, FIG. 2C, FIG. 2D, FIG. 2E, and FIG. 2F. Clamping member body 210 defines countersunk threaded through-holes 220 in a wall, threaded through-hole 230 in a base, mating protrusion 240, and pitot seal groove 250.

Pitot-static testing adapter 110 further includes a first clamping member 310, shown in FIG. 1A, FIG. 1B, FIG. 3A, FIG. 3B, FIG. 3C, FIG. 3D, FIG. 3E, and FIG. 3F, for attaching pitot-static testing adapter 110 to a pitot-static tube 115. First clamping member 310 is coupled via threaded through-hole 320 of first clamping member 310 to threaded through-hole 230 of clamping member body 210 by a threaded fastener 170. First clamping member 310 further defines bottom seal grooves 330.

Pitot-static testing adapter 110 further includes a second clamping member 410, shown in FIG. 1A, FIG. 1B, FIG. 4A, FIG. 4B, FIG. 4C, FIG. 4D, FIG. 4E, FIG. 4F, and FIG. 4G. Second clamping member 410 is coupled via threaded through-holes 430 of second clamping member 410 to threaded through-holes 220 of clamping member body 210 by threaded fasteners 180. Additionally, mating groove 450 accommodates mating protrusion 240 of clamping member body 210. Second clamping member 410 further defines pitot seal groove 460, threaded through-hole 440, and hemispherical cut-out 470. Hemispherical cut-out 470 further hinders contact with the pitot-static tube 115, including in the event that second clamping member 410 is over tightened against the pitot-static tube 115. Through-hole pitot port 420, defined by second clamping member 410 provides a means for aircraft pitot port pressures to be communicated through testing adapter 110. A threaded portion 422 of pitot port 420 provides means for attachment of pitot port fitting 160. Pitot port fitting 160 is configured to facilitate connection of pitot port testing lines, as well as pitot port cap 162. A through-hole 164 defined by pitot port cap 162 provides means of attaching pitot port cap wire tie 166 to pitot port cap 162, with another end of the pitot port cap wire tie 166 secured to the pitot port fitting 160.

Figure 1A:
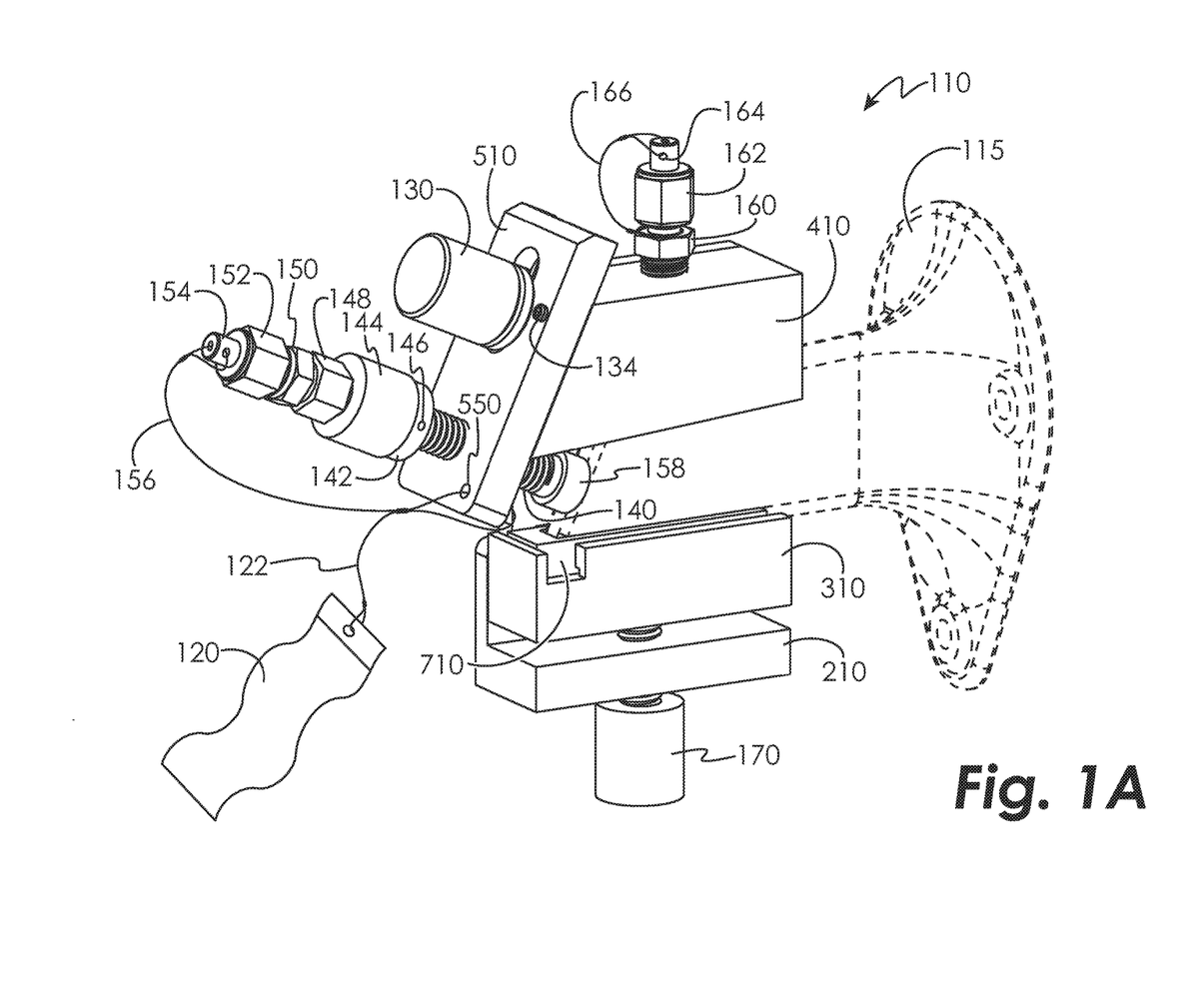
FIG. 1A, FIG. 1B, FIG. 1C, and FIG. 1D are a front perspective view, rear perspective view, a sectional view taken along line 1C-1C in FIG. 1D, and a bottom view respectively, of an illustrative pitot-static testing adapter according to one embodiment of the present disclosure.
Figure 1B:
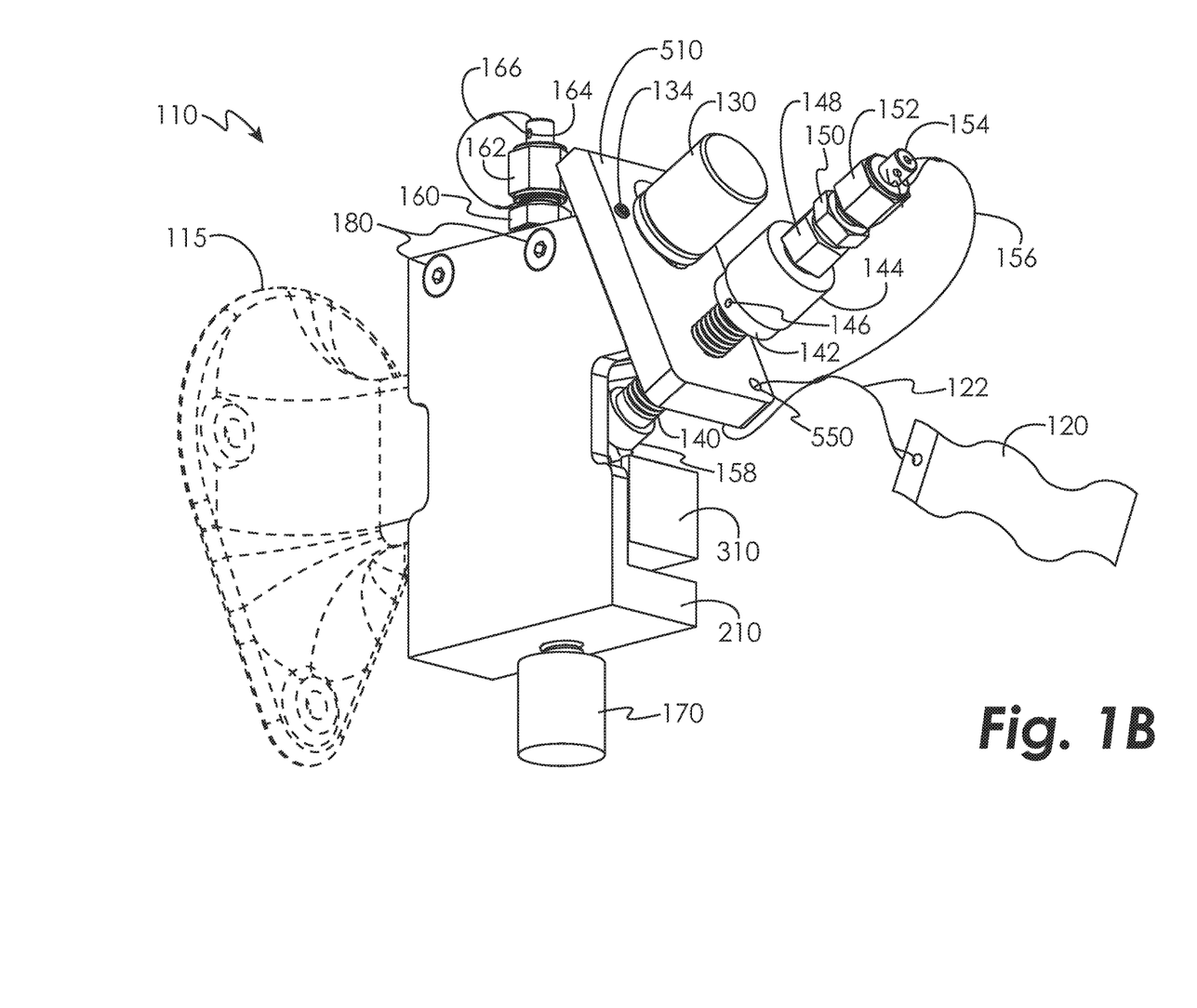

Pitot-static testing adapter 110 further includes a sliding member 510, shown in FIG. 1A, FIG. 1B, FIG. 5A, FIG. 5B, FIG. 5C, FIG. 5D, and FIG. 5E. Sliding member 510 defines adjustment through-hole 520, through which fastener 130 slidingly couples sliding member 510 to second clamping member 410. When fastener 130 is tightened onto washer 132 into through-hole 520 of sliding member 510, and ultimately into threaded through-hole 440 of second clamping member 410, sliding member 510 is locked into place relative to second clamping member 410. Sliding member 510 further defines threaded through-hole 530 to provide means for attachment of static port threaded shaft 140. As shown in FIG. 1A and FIG. 1B, static port threaded sleeve 142 and static port knurled nut 144 are attached to static port threaded shaft 140, with static port set screw 146 acting as a means of securing static port threaded sleeve 142 to static port threaded shaft 140. Static port reducer 148 threads onto static port threaded shaft 140, providing for attachment of static port fitting 150. A center-hole through static port threaded shaft 140 and static port fitting 150 provides for communication of pressure to the static port of the pitot-static tube 115. Static port seal 158 provides sealing against pitot-static tube 115, further providing a leak-proof seal and facilitating communication with the aircraft static port.

Static port fitting 150 is configured to facilitate connection of static port testing lines, as well as static port cap 152.

A through-hole 154 defined by static port cap 152 provides means of attaching static port cap wire tie 156 to static port cap 152. Static port cap wire tie 156 is also attached to sliding member 510 via through-hole 550 defined by slider body 510. By slidingly adjusting sliding member 510 relative to second clamping member 410 and tightening the static port threaded shaft 140, adjustment can be made such that static port seal 158 is brought into contact with the pitot-static tube and communication is made with the static port 117 of the pitot-static tube 115. Sliding member 510 further defines through-holes 540 to accept set screws 134 as an additional means of locking sliding member 510 in place relative to second clamping member 410.

Pitot-static testing adapter 110 further includes a pitot seal 610, shown in FIG. 6A, FIG. 6B, FIG. 6C, FIG. 6D, FIG. 6E, and FIG. 6F. Pitot seal 610 defines a back side 611, a front side 612, a top side 613, a bottom side 614, a left side 615, a bottom left side 616, a right side 617, and a bottom right side 618. Pitot seal 610 includes mating protrusions 620, along the bottom left side 616 and bottom right side 618, corresponding with pitot seal groove 250 of clamping member body 210 and pitot seal groove 460 of second clamping member 410. Along with mating protrusions 620, circumferential protrusion 640 provides additional sealing against second clamping member 410, further providing a leak-proof seal and facilitating communication with the aircraft pitot port 116. Pitot seal 610 defines a hemispherical cut-out 630 to accommodate the shape of the pitot-static tube 115. In one embodiment, hemispherical cut-out 630 is tapered to better accommodate the pitot-static tube 115, i.e. cut-out 630 is wider at the back side 611 than at the front side 612 (taper not illustrated).

In an illustrative embodiment, pitot seal 610 is clamped into place between clamping member body 210 and second clamping member 410 through positioning of the pitot seal mating protrusions 620 in the respective pitot seal grooves 250 and 460. Besides providing a substantially leak-proof seal with exemplary pitot port 116, the mating protrusions 620 and the compression of pitot seal 610 provided by attachment of second clamping member 410 to clamping member body 210 eliminate the need to use glue or adhesive to attach pitot seal 610 to adapter 110. In light of the glued-in-place pitot seals of the prior art, at least one embodiment greatly reduces the time and difficulty required to replace pitot seal 610, as well as facilitating access to the pitot seal 610 for inspection. By removing second clamping member cap screws 180 from an illustrative embodiment 110, clamping member body 210 can be separated from second clamping member 410, thereby providing simple access to and/or removal of pitot seal 610. In an alternative embodiment, pitot seal 610 can be slidingly coupled to adapter 110 between clamping member body 210 and second clamping member 410, such that seal 610 is retained in a direction that is different from the sliding direction without the use of adhesive.

Furthermore, because the seals, or sealing medium, used in pitot-static adapters of the current state of the art are attached to adapters using adhesive, seals of the current state of art must also be made from a material that promotes adhesion rather than a material chosen to maximize sealing properties. The seals of the current state of the art are difficult to replace because the adhesive bond must be broken and the remains of the previous seal must be scraped off of the adapter. Once the previous seal of the current art is fully removed, the replacement seal of the current art must then be glued into place, a potentially inconsistent procedure due to possible misalignment of the replacement seal prior to the setting of the adhesive or as the adhesive sets. The pitot seal 610 of at least one embodiment can be made of most any flexible material since no adhesive is required. In an illustrative embodiment, pitot seal 610 is made of silicone rubber, a flexible material with good sealing properties that has been previously unavailable for use by prior art adapters due to its poor adhesive properties.

Figure 1C:
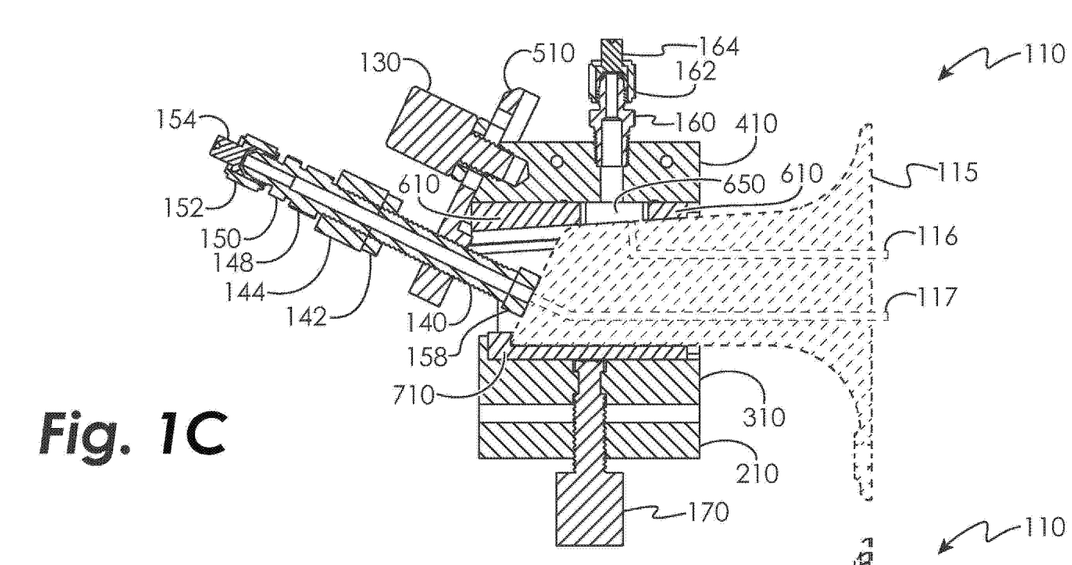
Figure 1D:
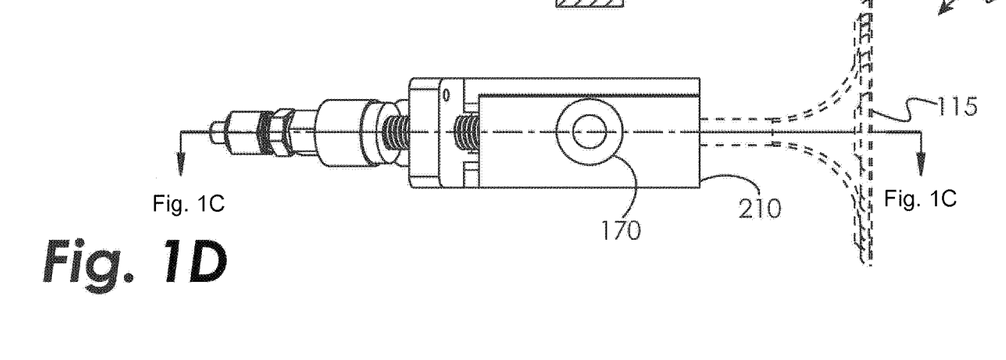
Figure 2A:
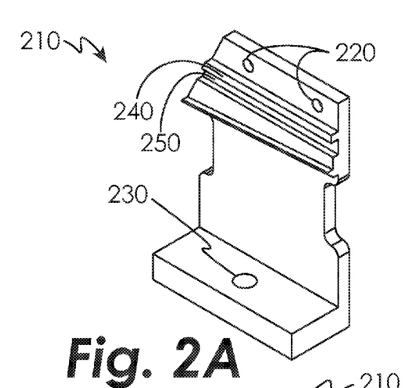
FIG. 2A, FIG. 2B, FIG. 2C, FIG. 2D, FIG. 2E, and FIG. 2F are a front perspective view, rear perspective view, top view, front view, side view, and rear view, respectively, of a clamping member body of the illustrative pitot-static testing adapter of FIG. 1A and FIG. 1B.
Figure 2B:
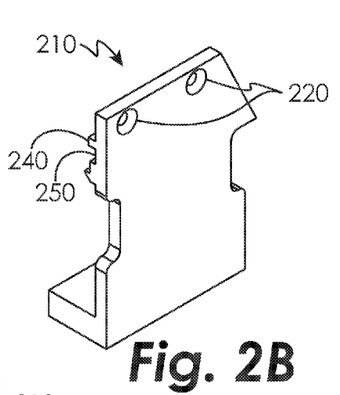
Figure 2C:
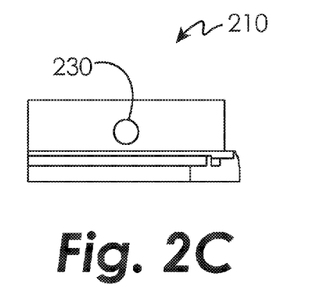
Figure 2D:
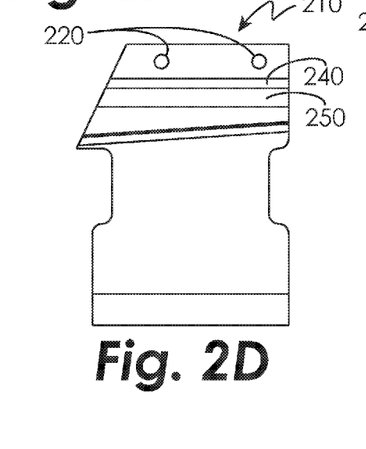
Figure 2E:
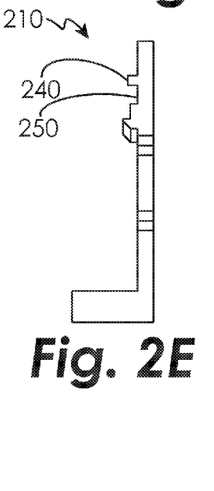
Figure 2F:
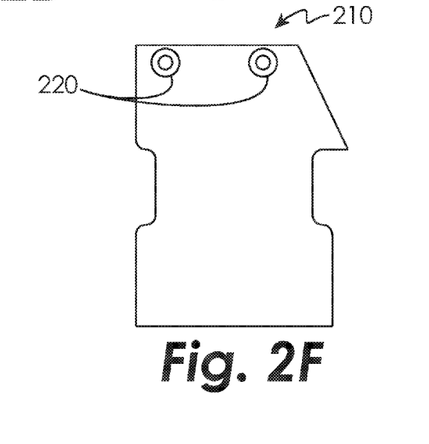
Figure 3A:
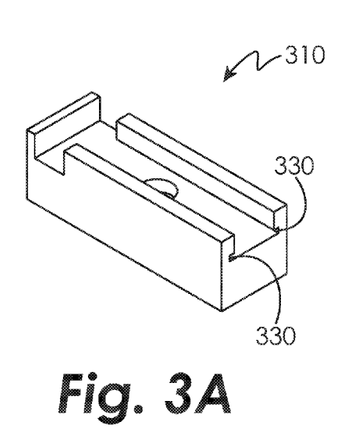
FIG. 3A, FIG. 3B, FIG. 3C, FIG. 3D, FIG. 3E, and FIG. 3F are a top perspective view, top view, bottom perspective view, right side view, front view, and left side view, respectively, of a first clamping member of the illustrative pitot-static testing adapter of FIG. 1A and FIG. 1B.
Figure 3B:
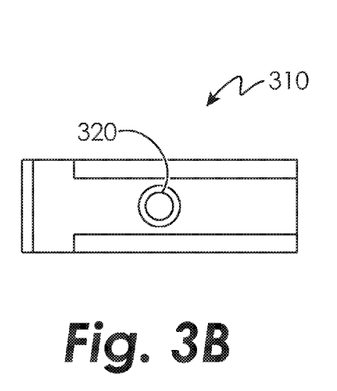
Figure 3C:
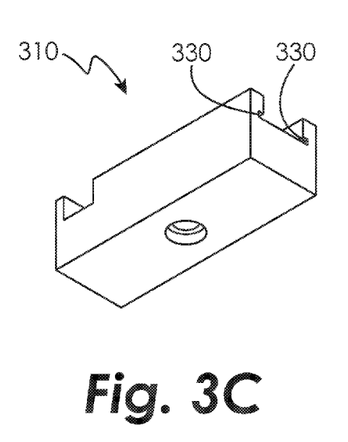
Figure 3D:
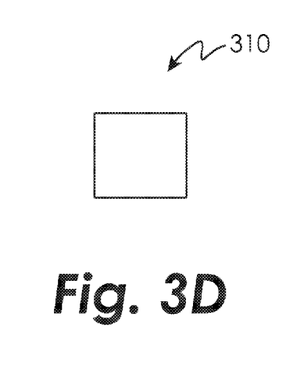
Figure 3E:
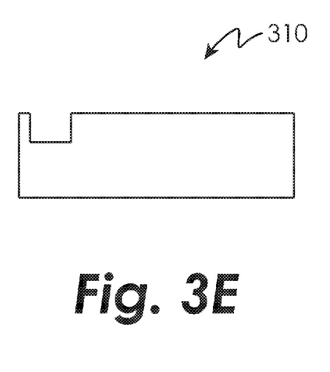
Figure 3F:
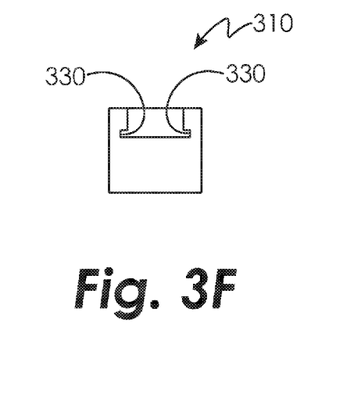
Figure 4A:
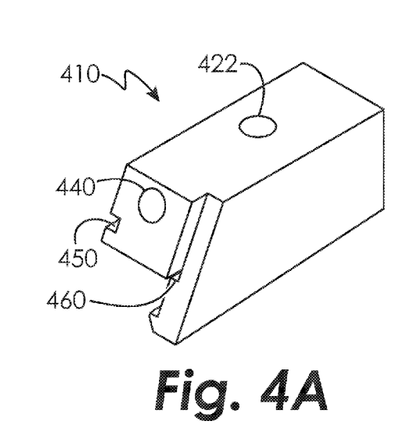
FIG. 4A, FIG. 4B, FIG. 4C, FIG. 4D, FIG. 4E, FIG. 4F, and FIG. 4G are a top perspective view, top view, bottom perspective view, right side view, front view, left side view, and rear view, respectively, of a second clamping member of the illustrative pitot-static testing adapter of FIG. 1A and FIG. 1B.
Figure 4B:
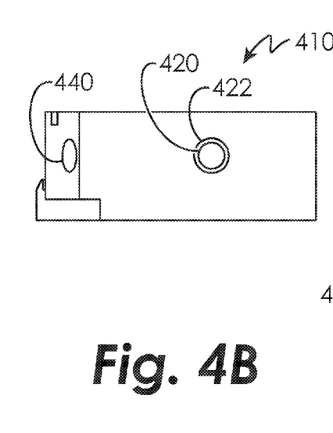
Figures 4C, 4G:
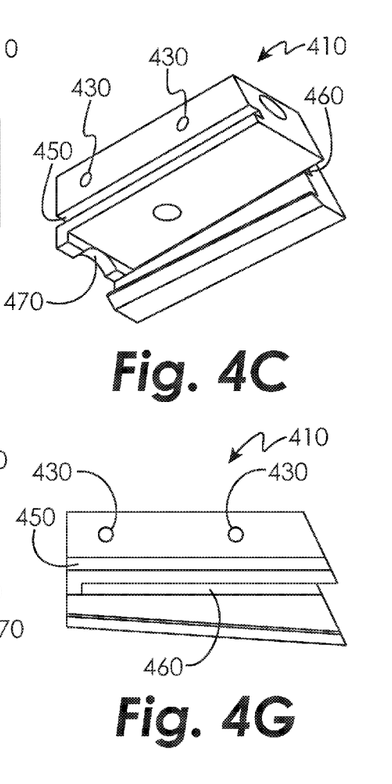
Figure 4D:
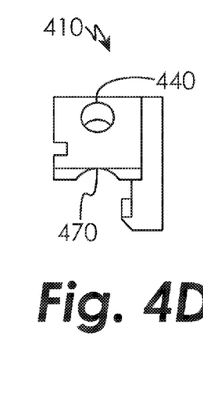
Figures 4E, 4F:
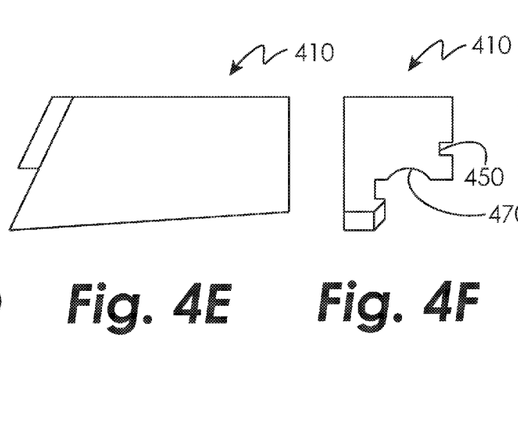
Figures 5A, 5B:
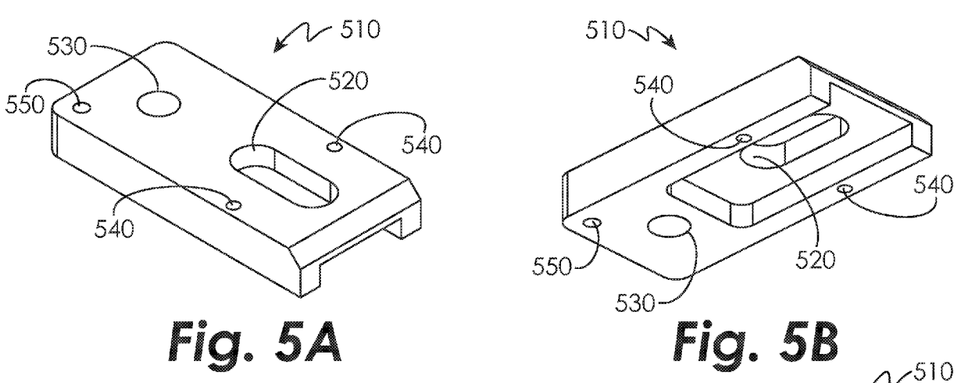
FIG. 5A, FIG. 5B, FIG. 5C, FIG. 5D, and FIG. 5E are a top perspective view, bottom perspective view, top view, side view, and bottom view, respectively, of a sliding member of the illustrative pitot-static testing adapter of FIG. 1A and FIG. 1B.
Figure 5C:
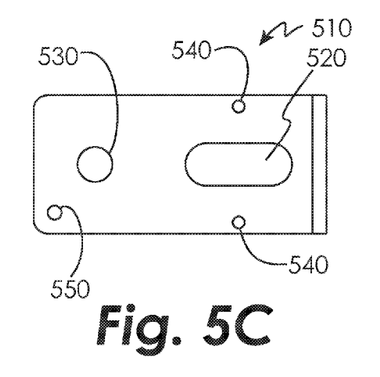
Figure 5D:
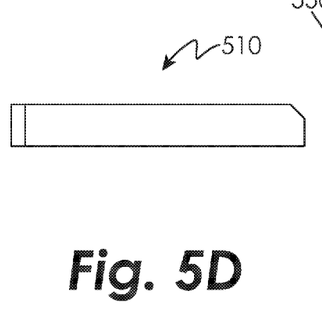
Figure 5E:
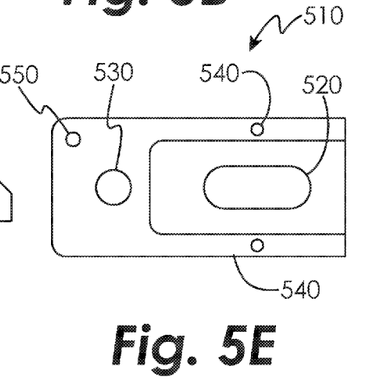
Figures 6A, 6B:
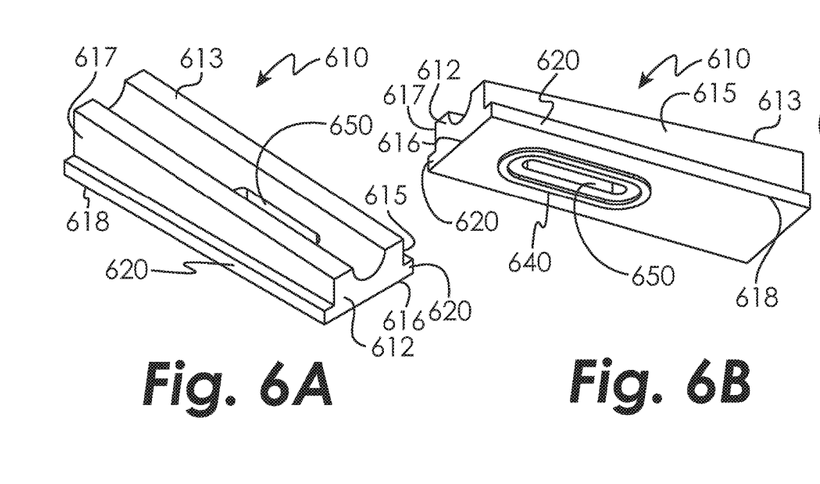
FIG. 6A, FIG. 6B, FIG. 6C, FIG. 6D, FIG. 6E, and FIG. 6F are a top perspective view, bottom perspective view, bottom view, top view, front view, and a right view, respectively, of a pitot port seal of the illustrative pitot-static testing adapter of FIG. 1A and FIG. 1B.
Figure 6C:
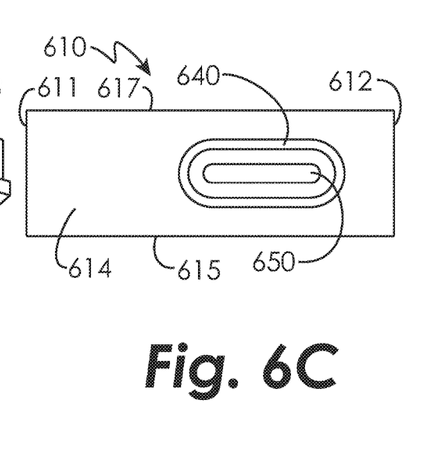
Figure 6D:
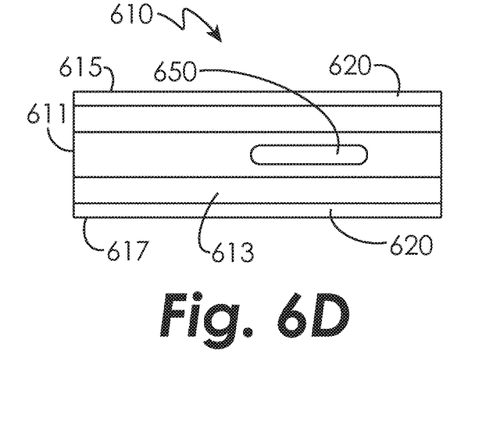
Figure 6E:
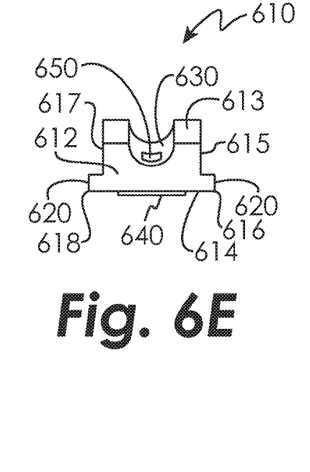
Figure 6F:
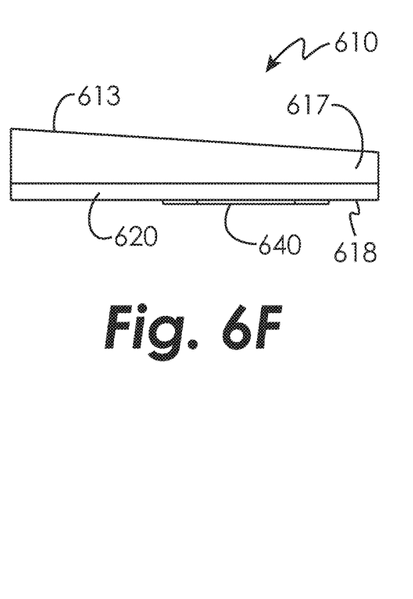
Figure 7A:
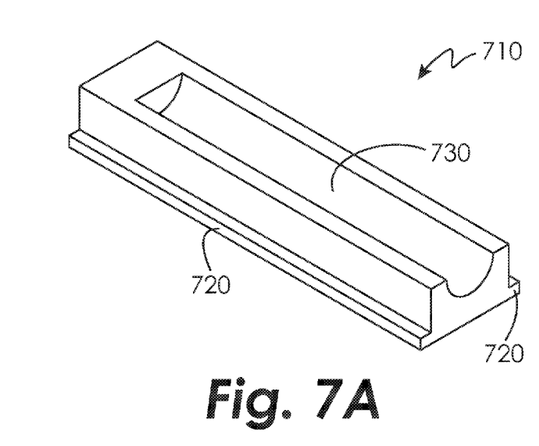
FIG. 7A, FIG. 7B, FIG. 7C, and FIG. 7D are a top perspective view, top view, front view, and left side view, respectively, of a bottom seal of the illustrative pitot-static testing adapter of FIG. 1A and FIG. 1B.
Figure 7B:
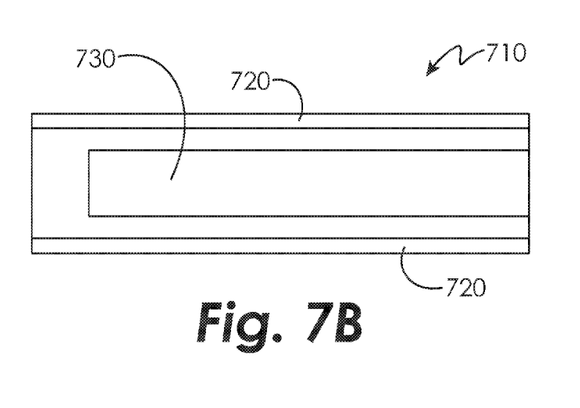
Figure 7C:
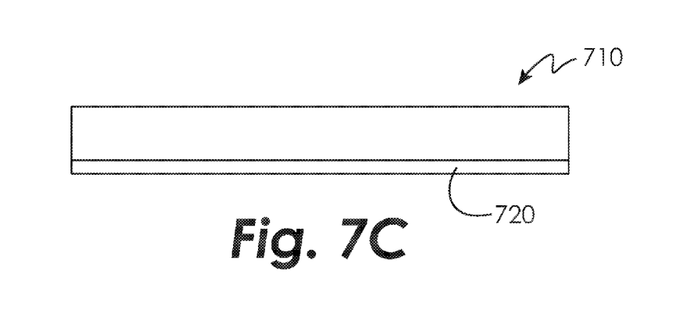
Figure 7D:
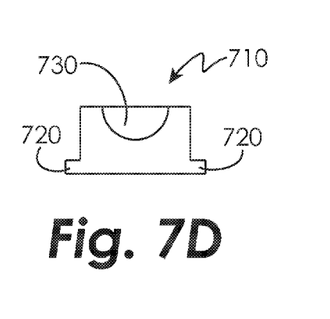

Pitot-static testing adapter 110 further includes a bottom seal 710, shown in FIG. 1A, FIG. 1B, FIG. 7A, FIG. 7B, FIG. 7C, and FIG. 7D. Bottom seal 710 is preferably made of a flexible material to minimize any damage to the aircraft pitot-static tube 115 when the adapter 110 is attached to the aircraft. Bottom seal 710 includes mating protrusions 720 corresponding with bottom seal grooves 330 of first clamping member 310. As with the pitot seal 610, bottom seal protrusions 720 may eliminate the need to use adhesive to hold bottom seal 710 in place against the first clamping member 310. As best seen in FIGS. 7A, 7B and 7D, bottom seal 710 further includes a hemispherical cut-out 730 for receipt of a portion of the pitot-static tube 115 as best seen in FIG. 1C.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

The invention claimed is:

1. A pitot-static test adapter for use in sealingly engaging a pitot-static tube having a pitot port and a static port, the test adapter comprising:
   a clamping member body having a base and a wall extending upwardly from the base;
   a first clamping member connected to the base and selectively movable relative to the base;
   a second clamping member connected to the clamping member body wall axially distant from the first clamping member, the second clamping member defining a through pitot port;
   a pitot seal frictionally engaged and removably secured without use of an adhesive with at least one of the second clamping member or the clamping member body, the pitot seal defining a communication hole aligned with the second clamping member pitot port and operable to provide an air tight seal between the second clamping member pitot port and the pitot-static tube pitot port when the pitot-static tube is clampingly engaged between the first clamping member and the second clamping member; and
   a static port seal movably connected to the second clamping member operable to sealingly engage the static port of the pitot-static tube clampingly engaged between the first clamping member and the second clamping member.

2. The test adapter of claim 1 wherein the clamping member body wall further defines a pitot seal groove; and
the second clamping member further defines a pitot seal groove positioned in alignment with the clamping member body wall pitot seal groove.

3. The test adapter of claim 2, wherein the pitot seal further comprises:
a top side;
a bottom side;
a right side;
a left side; and
a mating protrusion extending laterally outwardly from the right side and the left side adjacent the bottom side, each of the mating protrusions received in a respective one of the clamping member body wall pitot seal groove and the second clamp member pitot seal groove to frictionally engage and removably secure in position the pitot seal relative to the second clamping member with the pitot seal communication hole aligned with the second clamping member pitot port.

4. The test adapter of claim 3 wherein the pitot seal further comprises a circumferential protrusion extending axially outward from the pitot seal bottom side and completely around the pitot seal communication hole, the circumferential protrusion operable to abuttingly and sealingly engage the pitot seal to the second clamping member around the second clamping member pitot port on the clamping engagement of the pitot-static tube between the first clamping member and the second clamping member.

5. The test adapter of claim 4 wherein the pitot seal further comprises an elongate hemispherical cut-out in communication with the pitot seal communication hole, the hemispherical cut out operable to provide a positional relief and to abuttingly receive an exterior contour of the pitot-static tube clampingly engaged between the first clamping member and the second clamping member.

6. The test adapter of claim 5 wherein the pitot seal hemispherical cut out comprises a taper having a larger diameter width at a front side than at a back side, the taper operable to conform and abuttingly engage the pitot seal to the exterior contour of the pitot-static tube.

7. The test adapter of claim 4 wherein one of the clamping member body wall or the second clamping member further comprises a mating protrusion extending laterally outward and the other of the clamping member body wall or the second clamping member defines a mating groove operable to receive the mating protrusion on connection of the second clamping member to the clamping member body wall.

8. The test adapter of claim 4 further comprising a sliding member movably connected to the second clamping member and the static port seal, the sliding member operable to move relative to the second clamping member to position the static port seal in alignment with the pitot-static tube to sealingly engage with the pitot-static tube static port.

9. The test adapter of claim 1 further comprising a bottom seal frictionally engaged and removably secured to the first clamping member without the use of an adhesive, the bottom seal opposingly positioned to the pitot seal, the bottom seal operable to abuttingly engage the pitot-static tube clampingly engaged between the first clamping member and the second clamping member.

10. The pitot-static test adapter of claim 9 wherein the first clamping member further defines two opposing bottom seal grooves; and the bottom seal further comprises two mating protrusions, each of the two mating protrusions positioned in one of the respective two opposing bottom sealing grooves to frictionally engage and removably secure the bottom seal to the first clamping member.

11. The pitot-static test adapter of claim 1 wherein the pitot seal is made of silicone rubber.

12. A pitot-static test adapter for use in sealingly engaging a pitot-static tube having a pitot port and a static port, the test adapter comprising:
a clamping member body having a base and a wall extending upwardly from the base, the wall defining an elongate pitot seal groove;
a first clamping member connected to the clamping member body base and selectively movable relative to the clamping member body base, the first clamping member defining opposing elongate bottom seal grooves;
a second clamping member removably connected to the clamping member body wall axially distant from the first clamping member, the second clamping member defining an elongate pitot seal groove aligned with the clamping member body wall pitot seal groove, the second clamping member further defining a through pitot port;
a pitot seal defining a communication hole and further comprising:
a top side;
a bottom side;
a right side;
a left side; and
a mating protrusion extending laterally outwardly from the right side and the left side adjacent the bottom side, each of the mating protrusions received in a respective one of the clamping member body wall pitot seal groove and the second clamping member pitot seal groove to frictionally engage and removably secure in position the pitot seal relative to the second clamping member without the use of an adhesive whereby the pitot seal communication hole defined is aligned with the second clamping member pitot port, the pitot seal operable to provide an air tight seal between the second clamping member pitot port and the pitot-static tube pitot port clampingly engaged between the first clamping member and the second clamping member;
a bottom seal having two mating protrusions extending laterally outward, each one of the two mating protrusions positioned in one of the respective first clamping member two opposing bottom sealing grooves to frictionally engage and removably secure the bottom seal to the first clamping member without the use of an adhesive;
a sliding member movably connected to the second clamping member; and
a static port seal movably connected to the sliding member operable to sealingly engage the static port of the pitot-static tube clampingly engaged between the first clamping member and the second clamping member.

13. A method of using a pitot-static test adaptor to sealingly engage a pitot-static tube having a pitot port and a static port, the test adaptor having a clamping member body, a first clamping member movable relative to a second clamping member, a pitot seal, a bottom seal, and a static port seal, the method comprising the steps of:
frictionally engaging and removably securing without the use of an adhesive a pitot seal to at least one of a clamping member body or a second clamping member thereby aligning a pitot seal communication hole defined by the pitot seal with a pitot port defined by the second clamping member;

positioning a pitot-static tube between a first clamping member and the second clamping member thereby aligning a pitot-static tube pitot port with the pitot seal communication hole;

moving the first clamping member toward the second clamping member applying a clamping compressive force on the pitot seal by the pitot-static tube thereby providing an air tight seal between the pitot-static tube pitot port and the second clamping member pitot port; and sealingly engaging a test adapter static port seal with the pitot-static tube static port thereby providing an air tight seal between the pitot-static tube static port and the test adapter.

14. The method of claim 13 wherein the test adapter clamping member body and the second clamping member each further define a pitot seal groove, the method step of frictionally engaging and removably securing the pitot seal further comprises:

slidingly and frictionally engaging a laterally extending pitot seal mating protrusion in each of the seal groove in the clamping member body and the seal groove in the second clamping member.

15. The method of claim 14 wherein the pitot seal further includes a circumferential protrusion extending axially outward from a bottom side of the pitot seal, the method step of frictionally engaging and removably securing the pitot seal further comprises:

aligning the circumferential protrusion to completely surround the second clamping member pitot hole thereby providing an air tight seal between the pitot-static tube pitot port and the second clamping member pitot port.

16. The method of claim 15 further comprising the step of:
removing the pitot seal when the pitot seal is worn or damaged by slidingly disengaging the pitot seal from the test adapter without the removal of adhesive.

17. The method of claim 16 wherein the step of removing the pitot seal comprises:

disconnecting a sliding member from the second clamping member; and slidingly disengaging the pitot seal mating protrusions from the clamping member body pitot seal groove and the second clamping member seal groove.

18. The method of claim 16 wherein the step of removing the pitot seal comprises:

disconnecting the second clamping member from the clamping member body wall; and slidingly disengaging the pitot seal mating protrusions from the clamping member body pitot seal groove and the second clamping member seal groove.

19. The method of claim 13 further comprising frictionally engaging and removably securing without the use of an adhesive a bottom seal to the first clamping member, the bottom seal engaging the pitot-static tube on movement of the first clamping member toward the second clamping member.

20. The method of claim 19 wherein the first clamping member defines two opposing bottom seal grooves, the method of frictionally engaging and removably securing the the bottom seal to the first clamping member further comprises:

slidingly and frictionally engaging a laterally extending bottom seal mating protrusion in each one of the two opposing seal grooves in the first clamping member.

* * * * *